(12) United States Patent
McEwan

(10) Patent No.: US 10,496,096 B2
(45) Date of Patent: Dec. 3, 2019

(54) REAL TIME EFFECTIVE MASS AND MOMENT OF INERTIA MEASUREMENT

(71) Applicant: Digital Aerolus, Inc., Shawnee, KS (US)

(72) Inventor: Ian J. McEwan, Pasadena, CA (US)

(73) Assignee: Digital Aerolus, Inc., Shawnee, KS (US)

( * ) Notice: Subject to any disclaimer, the term of this patent is extended or adjusted under 35 U.S.C. 154(b) by 0 days.

(21) Appl. No.: 15/807,155

(22) Filed: Nov. 8, 2017

(65) Prior Publication Data

US 2018/0129207 A1 May 10, 2018

Related U.S. Application Data

(60) Provisional application No. 62/419,288, filed on Nov. 8, 2016.

(51) Int. Cl.
*G05D 1/00* (2006.01)
*B60W 50/00* (2006.01)
(Continued)

(52) U.S. Cl.
CPC ....... *G05D 1/0088* (2013.01); *B60W 50/0098* (2013.01); *G05D 1/0202* (2013.01);
(Continued)

(58) Field of Classification Search
CPC .... G05D 1/0088; G05D 1/0202; G05D 1/101; B64C 39/024; B64C 2201/141;
(Continued)

(56) References Cited

U.S. PATENT DOCUMENTS 5,646,850 A * 7/1997 Ishida .................. B60K 31/047
123/352
7,289,893 B2 10/2007 Gouriet et al.
(Continued)

FOREIGN PATENT DOCUMENTS

WO 2015180171 A1 12/2015

OTHER PUBLICATIONS

International Search Report and Written Opinion for Application No. PCT/US2017/060665; dated Jan. 16, 2018.

*Primary Examiner* — Marthe Y Marc-Coleman
(74) *Attorney, Agent, or Firm* — Hovey Williams LLP

(57) ABSTRACT

A control system and method for controlling an autonomous or semi-autonomous device. The method includes receiving a command signal representative of a desired acceleration, instructing the device to accelerate according to the desired acceleration, receiving a measurement signal representative of an actual acceleration, determining an initial control response based on the actual acceleration via a prediction model, applying a mathematical transform to the command signal and measurement signal, determining a mathematical model of the device based on the transformed command signal and transformed measurement signal, smoothing parameters of the mathematical model, inverting a transfer function of the mathematical model, updating control responses based on the mathematical model and inverted transfer function, and controlling the device according to the updated control responses. Improved performance of the control system itself and hence improved control of the autonomous or semi-autonomous device is thereby achieved.

20 Claims, 3 Drawing Sheets

(51) Int. Cl.
  *G05D 1/10*  (2006.01)
  *G05D 1/02*  (2006.01)
  *B64C 39/02*  (2006.01)

(52) U.S. Cl.
  CPC ..... *G05D 1/101* (2013.01); *B60W 2050/0028* (2013.01); *B60W 2050/0031* (2013.01); *B60W 2050/0088* (2013.01); *B60W 2530/10* (2013.01); *B60W 2530/16* (2013.01); *B64C 39/024* (2013.01); *B64C 2201/141* (2013.01); *B64C 2201/146* (2013.01)

(58) Field of Classification Search
  CPC ..... B60W 2050/0028; B60W 2530/10; B60W 2530/16
  USPC .......................................................... 701/3
  See application file for complete search history.

(56) References Cited

U.S. PATENT DOCUMENTS

| | | |
|---|---|---|
| 7,516,689 B2 | 4/2009 | Herman et al. |
| 8,126,642 B2 | 2/2012 | Trepagnier et al. |
| 8,170,739 B2 | 5/2012 | Lee |
| 8,548,671 B2 | 10/2013 | Wong et al. |
| 9,315,178 B1 | 4/2016 | Ferguson et al. |
| 2007/0070738 A1* | 3/2007 | Gonzalez-Banos .... B25J 9/1628 365/200 |
| 2015/0057844 A1 | 2/2015 | Parrot |

\* cited by examiner

REAL TIME EFFECTIVE MASS AND MOMENT OF INERTIA MEASUREMENT

RELATED APPLICATIONS

This regular utility non-provisional patent application claims priority benefit with regard to all common subject matter of earlier filed U.S. Provisional Patent Application titled "REAL TIME EFFECTIVE MASS AND MOMENT OF INERTIA MEASUREMENT", Ser. No. 62/419,288, filed on Nov. 8, 2016, which is hereby incorporated by reference in its entirety into the present application.

BACKGROUND

Drones and other autonomous or semi-autonomous devices are typically unstable by nature and require control systems that can implement fast and accurate control loops to correct undesirable movements. These movements can be caused by external forces such as wind and turbulence or by internal control errors. A common control system uses proportional integral derivative (PID) controllers. Other more complex systems use signal filters. However, tuning PIDs and signal filters is difficult and is often restricted to a subset of scenarios or requires some human input. Importantly, control systems cannot perform these tunings in time or in a desired manner, such as without human input, to be used in control of autonomous or semi-autonomous devices.

PIDs use the language of Laplace transforms and transfer functions. A transfer function is a time-independent way of describing how a signal changes as it propagates through a system. For example, a signal passing through a first component and then through a second component has a combined transfer function that is a product of the two functions describing the individual devices. The problem of controlling both components accurately and immediately may be seen as trying to find a system where the totality of sensors, actuators, environment, communication, and calculations should result in as close to an identity function as possible. The desired control signal passes first through a PID-like controller and then through actuators while being affected by the environment. The transfer function of the controller must then be the inverse of the transfer function that describes everything else in the system if their product is to be identity. Finding the inverse function for an arbitrary non-linear process function is difficult. As previously stated, this cannot be performed in time or in a sufficient manner to be used in control of autonomous or semi-autonomous devices.

Some control systems focus on attempting to modify the PIDs or to find methods of tuning the PIDs. These control systems use fixed values and/or active control loops such as PIDs where these parameters are buried in the control loop's parameters. The parameters contain too many elements and are not separable, which is not conducive to improving control of the devices.

SUMMARY

Embodiments of the present invention solve the above-described and other problems and limitations by providing an improved autonomous or semi-autonomous device control system and method for controlling an autonomous or semi-autonomous device. The invention described herein improves performance of the control system itself and hence improves control of the autonomous or semi-autonomous device.

An embodiment of the invention is a method of controlling a drone. First, the drone may be instructed to accelerate according to an initial command. An actual acceleration (i.e., a measured response) of the drone may then be determined. An initial control response may then be determined based on the actual acceleration and a desired acceleration. The initial control response may incorporate negative feedback, a proportional integral derivative (PID), a filter such as a Kalman filter, or any other suitable approach or combination thereof. For example, the PID may include a linear combination (weighted sum) of a scaled error, an integral of the scaled error, and a derivative of the scaled error. A small amount of random noise may also be added to the initial control response to flatten an overall noise power spectrum of the drone.

The drone's thrusters may then be actuated according to the initial control response such that the drone lifts off a ground surface or home base. A mathematical transform may then be applied to the initial command and the actual acceleration. The transform may be a Fourier transform, a Laplace transform, a wavelet transform, an empirical mode decomposition, or any other suitable transform.

The transformed initial command and actual acceleration are fit to a mathematical model of the drone. The model may be expressed in advanced algebras such as tensor or geometric algebras to combine parameters. The transformed initial command and actual acceleration may be fit via a least-square fitting, Newton's method, or any other suitable technique. Mass and drag of the drone may also be determined from forces applied to the drone and its resulting acceleration. Similarly, moment of inertia and drag of the drone may be determined from torques applied to the drone and its resulting angular velocities.

Parameters of the mathematical model are then smoothed. For example, at least some random noise may be averaged out to obtain more precise parameter values. Outputs, values, parameters, and equations developed from the above steps are then used to form a control loop. Specifically, successive control responses may be generated according to the mathematical model.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Figure 1:
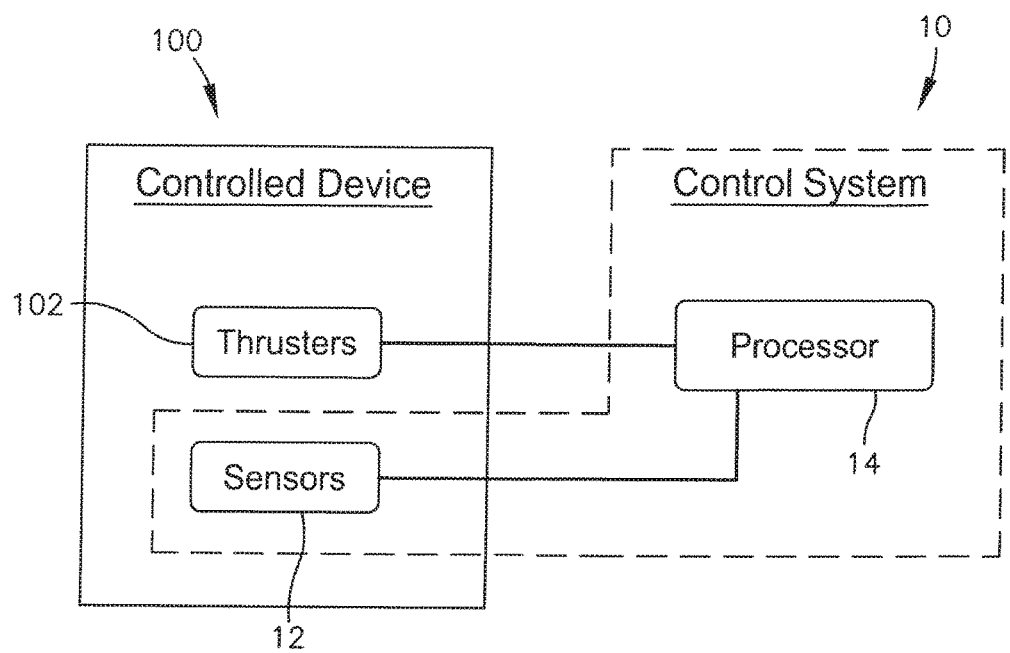
FIG. 1 is a schematic diagram of a control system constructed in accordance with an embodiment of the invention and shown in communication with an autonomous or semi-autonomous device.

Turning to the drawing figures, and particularly FIG. 1, embodiments of the present invention may be used for controlling an autonomous or semi-autonomous device 100. The autonomous or semi-autonomous device 100 may be a drone, a robot, a vehicle, a component thereof such as a robot arm or steady-cam gimble, or any other actuatable machine or device. The autonomous or semi-autonomous device 100 may include thrusters 102 for generating acceleration forces. The thrusters 102 may be propellers, rotors, rockets, jets, compressed gas expulsion systems, actuators, wheeled drive trains, or any other suitable propulsion system.

A control system 10 constructed in accordance with an embodiment of the present invention will now be described in detail. The control system 10 broadly comprises a plurality of sensors 12 and a processor 14.

The sensors 12 sense positions, movement, and/or acceleration of the autonomous or semi-autonomous device 100 and thus may be mounted on the autonomous or semi-autonomous device 100 or positioned near the autonomous or semi-autonomous device 100. The sensors 12 may be or may include accelerometers, motion sensors, proximity sensors, pressure sensors, cameras, radar detectors, lidar detectors, global positioning system (GPS) sensors, or any other suitable sensing devices.

The processor 14 interprets data from the sensors 12 and controls the autonomous or semi-autonomous device 100 according to the interpreted data and other inputs, as described in more detail below. The processor 14 may include a circuit board, memory, and other electronic components such as a display and inputs for receiving external commands and a transmitter for transmitting data and electronic instructions. The processor 14 may be mounted in or on the autonomous or semi-autonomous device 100 or may be part of a remote controller or remote computing system in communication with the autonomous or semi-autonomous device 100.

The processor 14 may implement aspects of the present invention with one or more computer programs stored in or on computer-readable medium residing on or accessible by the processor. Each computer program preferably comprises an ordered listing of executable instructions for implementing logical functions and controlling the autonomous or semi-autonomous device 100 according to commands and other inputs. Each computer program can be embodied in any non-transitory computer-readable medium, such as a memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Control of the autonomous or semi-autonomous device 100 will now be described in more detail. First, the processor 14 may receive an initial command and instruct the autonomous or semi-autonomous device 100 to accelerate according to the initial command, as represented by start point 200. The initial command may be a first movement command input from a user or a calibration movement or other initialization movement.

An actual acceleration of the autonomous or semi-autonomous device 100 (e.g., $\vec{a}_t$) may then be determined, as shown in block 202. For example, a measured response may be received from the sensors 12.

An initial control response based on the actual acceleration and a desired acceleration may then be determined, as shown in block 204. The initial control response may incorporate negative feedback, a proportional integral derivative (PID), a filter such as a Kalman filter, or any other suitable approach or combination thereof. For example, the PID may include a linear combination (weighted sum) of a scaled error, an integral of the scaled error, and a derivative of the scaled error. A small amount of random noise may also be added to the initial control response to flatten an overall noise power spectrum of the autonomous or semi-autonomous device 100, as shown in block 206.

The thrusters 102 may then be actuated according to the initial control response, as shown in block 208. For example, the processor 14 may increase output of the thrusters 102 by a force of $\vec{f}_t$ such that the autonomous or semi-autonomous device lifts off a ground surface or home base. The processor 14 may also record the initial control response on the memory for future reference.

A mathematical transform may then be applied to the initial command and the actual acceleration, as shown in block 210. The transform may be a Fourier transform, a Laplace transform, a wavelet transform, an empirical mode decomposition, or any other suitable transform. For example, Fourier transforms may be applied to the equations $\vec{A}_\xi = \mathcal{F}(a_t)$ and $\vec{F}_\xi = \mathcal{F}(f_t)$.

The transformed initial command and actual acceleration are fit to a mathematical model of the autonomous or semi-autonomous device 100, as shown in block 212. The model may be expressed in advanced algebras such as tensor or geometric algebras to combine parameters. The transformed initial command and actual acceleration may be fit via a least-square fitting, Newton's method, or any other suitable technique. For example, $\vec{A}_\xi$ and $\vec{F}_\xi$ may be fit to a mathematical model such as $F_\xi + F_{0t} = M_t a_\xi e^{2\pi \Phi_\xi i}$. Mass and drag of the autonomous or semi-autonomous device 100 may also be determined from forces applied to the autonomous or semi-autonomous device 100 and its resulting acceleration. Similarly, moment of inertia and drag of the autonomous or semi-autonomous device 100 may be determined from torques applied to the autonomous or semi-autonomous device 100 and its resulting angular velocities.

Parameters of the mathematical model, such as $M_f$, $\phi_f$, and $F_{0f}$ may then be smoothed, as shown in block 214. For example, at least some random noise may be averaged out to obtain more precise parameter values.

Outputs, values, parameters, and equations developed from steps 202-208 and 210-214, represented by ending point 216, are then used to form a control loop. Specifically, successive control responses may be generated in step 204 according to the mathematical model developed through steps 210-214.

Figure 2:
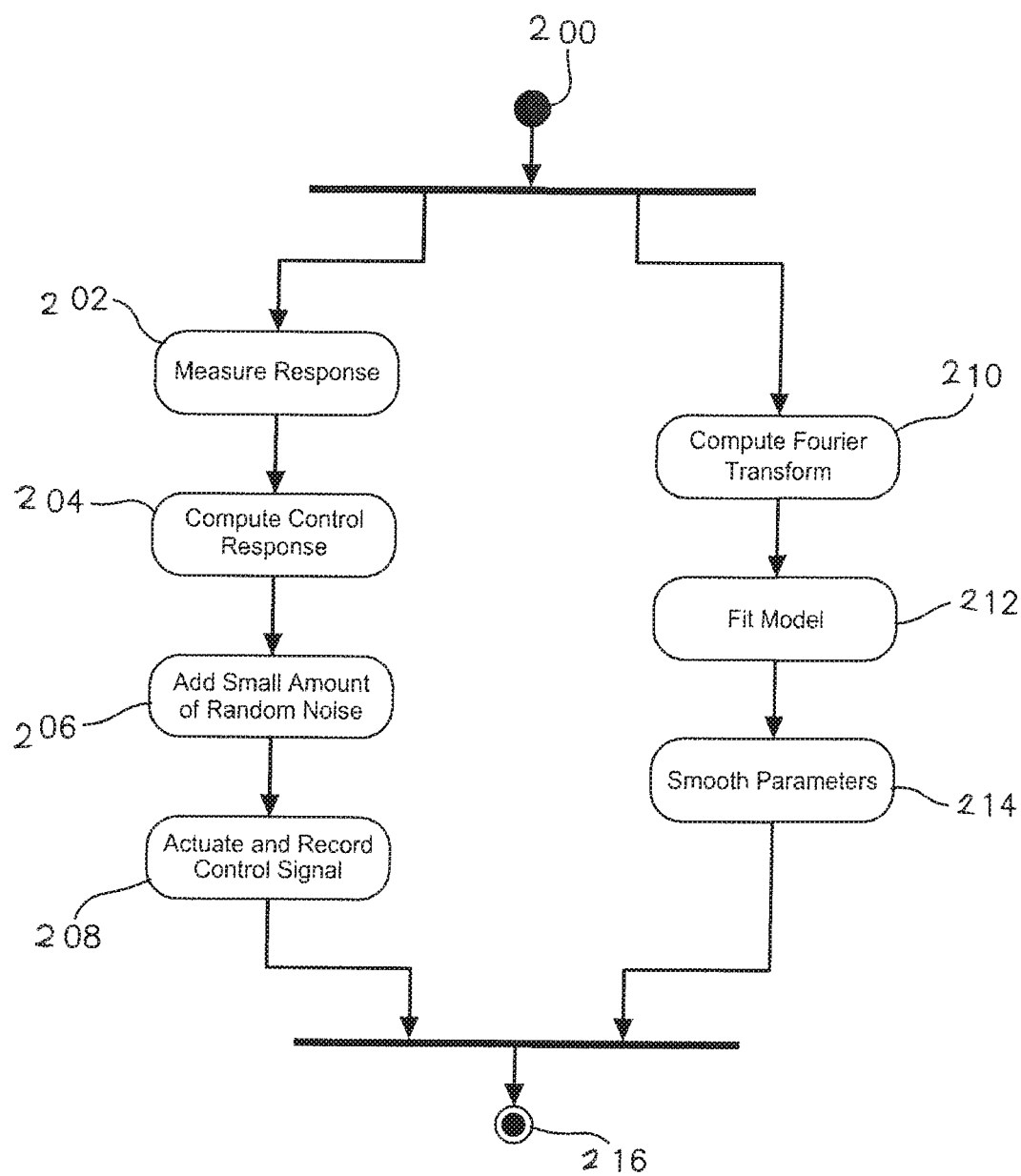
FIG. 2 is a flow diagram of a method of controlling an autonomous or semi-autonomous device.
Figure 3:
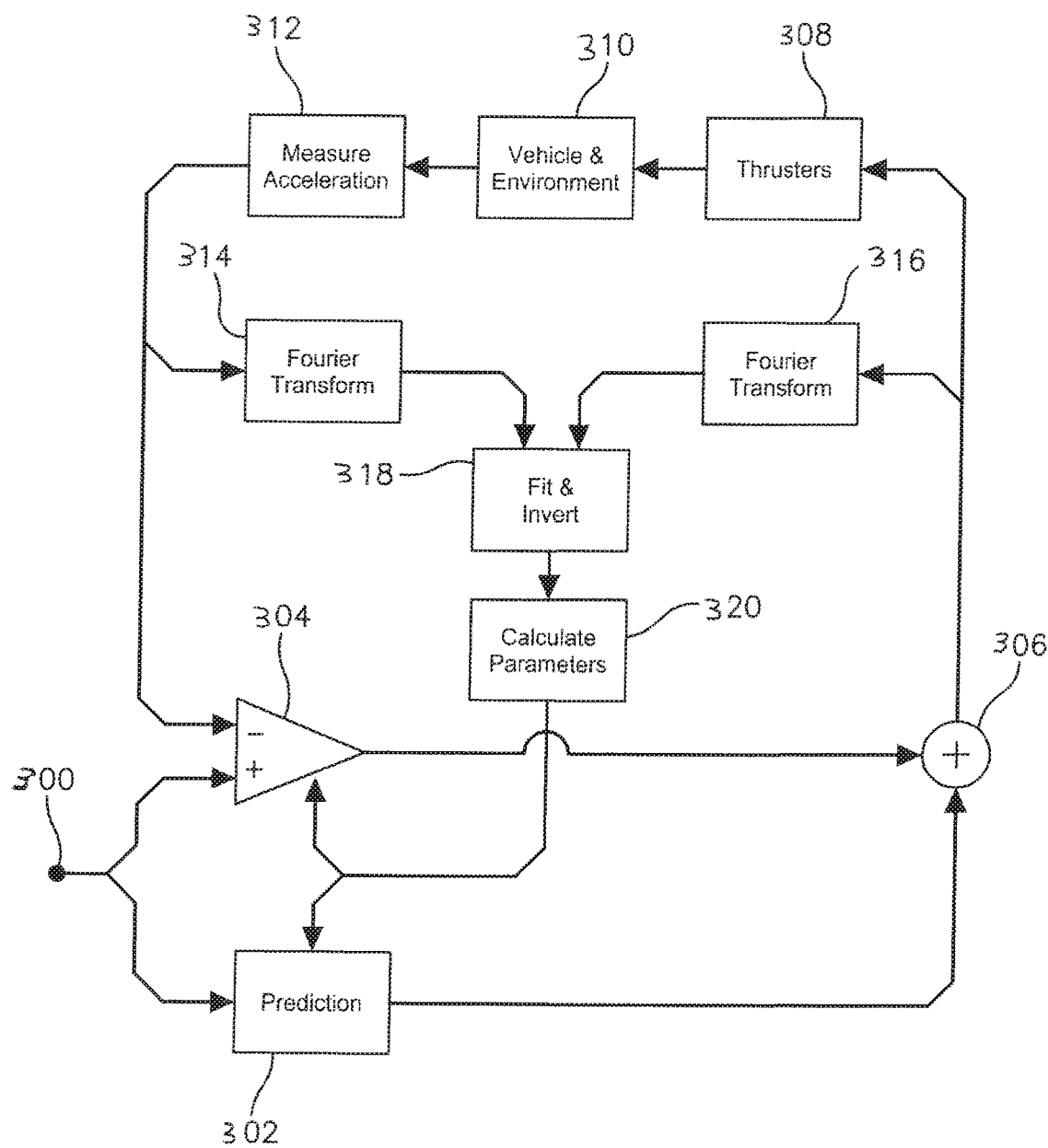
FIG. 3 is a signal diagram corresponding to the method of FIG. 2.

Turning to FIG. 3, and with reference to FIGS. 1 and 2, a signal diagram of an exemplary control loop will now be described in more detail. First, a desired acceleration signal representative of the above-described initial command is input at node 300.

A predictive model is used to compute a base control response signal representative of the initial control response described above, as shown in block 302. Signals representative of the desired acceleration and previously measured acceleration are used in a PID to determine a correction to the base control response, as shown in block 304. The base control response and correction are summed together to form a command signal, as shown in block 306.

The command signal is transmitted to the thrusters 308 to effect acceleration of the autonomous or semi-autonomous device 100, as shown in block 308. The autonomous or semi-autonomous device 100 also interacts with its environment such that an actual acceleration is realized, as shown in block 310. That is, the autonomous or semi-autonomous device 100 is subjected to gravity, atmospheric pressure, wind, drag, and other natural forces due to its mass, shape, and other characteristics. The autonomous or semi-autonomous device 100 may also contact or impact obstacles such as the ground, a wall, and other autonomous or semi-autonomous devices. The sensors 12 return a measured actual acceleration signal representative of a measured actual acceleration resulting from contributions of the thrusters 308 and the environment, as shown in block 312.

A Fourier transform is then applied to the measured actual acceleration signal, as shown in block 314. A Fourier transform is also applied to the command signal (the sum of the base control response signal and the correction from block 306), as shown in block 316. Results of the Fourier transforms are then fit to a mathematical model. Transfer functions of the mathematical model are then derived and inverted, as shown in block 318. Parameters of the mathematical model are then extracted, as shown in block 320. The mathematical model, extracted parameters, and/or transfer functions are then used to update the prediction model of block 302 and the PID of block 304, thus completing the control loop. It should be noted that a Kalman filter or other filter having a time delay or phase ambiguity may be used in place of the PID.

The above-described autonomous or semi-autonomous device control system 10 and method provide several advantages including improved control system performance and hence improved control of the autonomous or semi-autonomous device. For example, the transfer functions are directly and in near real time derived via a mathematical model of the autonomous or semi-autonomous device 100 itself and used to compute the parameters of the PID. The linearity of Fourier transforms and a mathematical model of the autonomous or semi-autonomous device 100 are used to fit measurements from different frequencies simultaneously for finding a suitable filter model that can then be used to retrieve effective mass, moment of inertia, and phase responses. Control and measurement signals are separated into a set of solutions with different frequency characteristics, using for example an integral transform, each of which can be separately fit to the given mathematical model. By fitting all of them simultaneously, there is sufficient information to highly constrain the parameters of the mathematical model. Also, some amount of random noise is averaged away and better parameters are obtained by using an integral transform to obtain this set of solutions and by highly constraining the model. Furthermore, a predictive "forward" model is used to help estimate a state of the autonomous or semi-autonomous device 100 before an error signal is obtained.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented system for controlling an autonomous or semi-autonomous device, the computer-implemented system comprising:
   a processor configured to:
      receive a command signal representative of a desired acceleration;
      instruct the autonomous or semi-autonomous device to accelerate according to the command signal;
      receive a measurement signal representative of an actual acceleration of the autonomous or semi-autonomous device;
      determine an initial control response based on the actual acceleration via a prediction model;
      apply a mathematical transform to the command signal and the measurement signal;
      determine a mathematical model of the autonomous or semi-autonomous device based on the transformed command signal and transformed measurement signal so as to output a plurality of parameters representing properties inherent of the autonomous or semi-autonomous device;
      smooth the parameters of the mathematical model;
      determine a transfer function of the mathematical model;
      invert the transfer function;
      determine updated control responses based on the mathematical model and the inverted transfer function; and
      control the autonomous or semi-autonomous device according to the updated control responses, the mathematical model being updatable based on subsequent command signals and subsequent measurement signals such that the parameters and the transfer function of the mathematical model are dynamic.

2. The computer-implemented system of claim 1, wherein the mathematical transform is selected from the group consisting of a Fourier transform, a Laplace transform, a wavelet transform, and an empirical mode decomposition.

3. The computer-implemented system of claim 1, wherein the processor is further configured to incorporate noise into the initial control response so as to flatten an overall noise power spectrum of the autonomous or semi-autonomous vehicle.

4. The computer-implemented system of claim 1, wherein the processor is configured to determine the mathematical model according to least-square fitting or Newton's method.

5. The computer-implemented system of claim 1, wherein the processor is further configured to determine a mass and drag of the autonomous or semi-autonomous device based on the actual acceleration and an applied force resulting in the actual acceleration.

6. The computer-implemented system of claim 1, wherein the actual acceleration is an angular acceleration, the processor being further configured to determine a moment of inertia and drag of the autonomous or semi-autonomous device based on the actual acceleration and an applied torque resulting in the actual acceleration.

7. The computer-implemented system of claim 1, wherein the mathematical model is expressed in tensor or geometric algebraic equations.

8. The computer-implemented system of claim 1, wherein the control response is determined according to a proportional integral derivative (PID).

9. The computer-implemented system of claim 1, wherein the processor is further configured to pass the inverted transfer function through a Kalman filter.

10. The computer-implemented system of claim 9, wherein the filter has a time delay or phase ambiguity.

11. A computer-implemented method of controlling an autonomous or semi-autonomous device, the method comprising the steps of:
    receiving a command signal representative of a desired acceleration;
    instructing the autonomous or semi-autonomous device to accelerate according to the command signal;
    receiving a measurement signal representative of an actual acceleration of the autonomous or semi-autonomous device;
    determining an initial control response based on the actual acceleration via a prediction model;
    applying a mathematical transform to the command signal and the measurement signal;
    determining a mathematical model of the autonomous or semi-autonomous device based on the transformed command signal and transformed measurement signal so as to output a plurality of parameters representing properties inherent of the autonomous or semi-autonomous device;
    smoothing the parameters of the mathematical model;
    determining a transfer function of the mathematical model;
    inverting the transfer function;
    determining updated control responses based on the mathematical model and the inverted transfer function; and
    controlling the autonomous or semi-autonomous device according to the updated control responses, the mathematical model being updatable based on subsequent command signals and subsequent measurement signals such that the parameters and the transfer function of the mathematical model are dynamic.

12. The computer-implemented method of claim 11, wherein the mathematical transform is selected from the group consisting of a Fourier transform, a Laplace transform, a wavelet transform, and an empirical mode decomposition.

13. The computer-implemented method of claim 11, further comprising the step of incorporating noise into the initial control response so as to flatten an overall noise power spectrum of the autonomous or semi-autonomous vehicle.

14. The computer-implemented method of claim 11, wherein the mathematical model is determined according to least-square fitting or Newton's method.

15. The computer-implemented method of claim 11, further comprising the step of determining a mass and drag of the autonomous or semi-autonomous device based on the actual acceleration and an applied force resulting in the actual acceleration.

16. The computer-implemented method of claim 11, wherein the actual acceleration is an angular acceleration, the method further comprising the steps of determining a moment of inertia and drag of the autonomous or semi-autonomous device based on the actual acceleration and an applied torque resulting in the actual acceleration.

17. The computer-implemented method of claim 11, wherein the mathematical model is expressed in tensor or geometric algebraic equations.

18. The computer-implemented method of claim 11, wherein the control response is determined according to a proportional integral derivative (PID).

19. The computer-implemented method of claim 11, further comprising the step of passing the inverted transfer function through a Kalman filter.

20. A computer-implemented system for controlling an autonomous or semi-autonomous drone, the computer-implemented system comprising:
    a processor configured to:
        receive a command signal;
        instruct the autonomous or semi-autonomous drone to accelerate according to the command signal;
        receive a measurement signal representative of an actual acceleration of the autonomous or semi-autonomous drone;
        determine an initial control response according to a proportional integral derivative (PID) based on the actual acceleration via a prediction model;
        apply a mathematical transform to the command signal and the measurement signal;
        determine a mathematical model of the autonomous or semi-autonomous drone according to least-square fitting or Newton's method based on the transformed command signal and transformed measurement signal, the mathematical model being expressed in tensor or geometric algebraic equations so as to output a plurality of parameters representing properties inherent of the autonomous or semi-autonomous device;
        smooth the parameters of the mathematical model;
        determine a transfer function of the mathematical model;
        invert the transfer function;
        pass the inverted transfer function through a Kalman filter;
        determine a mass, moment of inertia, and phase responses based on the mathematical model and inverted transfer function;
        determine updated control responses based on the mathematical model, inverted transfer function, mass, moment of inertia, and phase responses; and
        control the autonomous or semi-autonomous drone according to the updated control responses, the mathematical model being updatable based on subsequent command signals and subsequent measurement signals such that the parameters and the transfer function of the mathematical model are dynamic.

\* \* \* \* \*